United States Patent
Yeh et al.

(10) Patent No.: US 8,724,983 B2
(45) Date of Patent: May 13, 2014

(54) FLASH STRUCTURE FOR THE CAMERA FUNCTION OF A HANDHELD ELECTRONIC DEVICE

(71) Applicants: Yang-Shan Yeh, Taipei (TW); Chi-Wei Tao, Taipei (TW)

(72) Inventors: Yang-Shan Yeh, Taipei (TW); Chi-Wei Tao, Taipei (TW)

( * ) Notice: Subject to any disclaimer, the term of this patent is extended or adjusted under 35 U.S.C. 154(b) by 0 days.

(21) Appl. No.: 13/674,018

(22) Filed: Nov. 10, 2012

(65) Prior Publication Data
US 2013/0121677 A1    May 16, 2013

(30) Foreign Application Priority Data
Nov. 10, 2011   (TW) ............................... 100221222 U

(51) Int. Cl.
*G03B 15/03* (2006.01)
*G03B 17/02* (2006.01)
*H04N 5/225* (2006.01)

(52) U.S. Cl.
USPC ............................. 396/155; 396/535; 348/374

(58) Field of Classification Search
USPC .......................... 396/155, 176, 199–200, 535;
348/373–374, 370–371; 362/3, 11, 16
See application file for complete search history.

(56) References Cited

U.S. PATENT DOCUMENTS

2009/0051779 A1 * 2/2009 Rolston ...................... 348/222.1

* cited by examiner

*Primary Examiner* — Clayton E LaBalle
*Assistant Examiner* — Minh Phan
(74) *Attorney, Agent, or Firm* — Raymond Y. Chan; David and Raymond Patent Firm

(57) ABSTRACT

A flash structure for the camera function of a handheld electronic device having at least a camera module as well as an image sensor and a camera lens contained in the camera module, comprising an outer cover, an annular reflector, at least a light diffuser, and one or a plurality of fixed light-emitting elements which are light emitting diodes or electronic flashes to provide continuous or intermittent supplemental light source. The center of the annular reflector passes through the camera lens and is formed on the motherboard of the handheld electronic device, and is arranged with a through-slot. The one or the plurality of light-emitting elements are embedded in the through-slot of the annular reflector, arranged around the camera lens, and electrically connected to the motherboard. The light diffuser is disposed outside the annular reflector, outside the light-emitting element and positioned around the camera lens.

15 Claims, 6 Drawing Sheets

FLASH STRUCTURE FOR THE CAMERA FUNCTION OF A HANDHELD ELECTRONIC DEVICE

NOTICE OF COPYRIGHT

A portion of the disclosure of this patent document contains material which is subject to copyright protection. The copyright owner has no objection to any reproduction by anyone of the patent disclosure, as it appears in the United States Patent and Trademark Office patent files or records, but otherwise reserves all copyright rights whatsoever.

BACKGROUND OF THE PRESENT INVENTION

1. Field of Invention

The present invention relates to a flash structure for camera, more particularly a flash structure for the camera function of a handheld electronic device that has a simple construction and enhances the picture, video and real-time image quality of the handheld electronic device.

2. Description of Related Arts

Nowadays camera module is an essential component in every handheld electronic device. For instance, digital cameras, mobile phones, smartphones, tablet computers, PDA and laptop computers all come with at least a basic camera module that performs fundamental picture taking and videotaping functions.

Smartphone makers in particular pay attention to the performance of camera module in their products. The camera module in many smartphones has the equivalent or even better performance than regular digital cameras that can replace part of the functions of a digital camera. Many female consumers care about the performance of camera function in smartphones so they can capture beautiful images when they take pictures or video tape with their phones.

For the camera modules in a regular handheld electronic device, for example, a mobile phone, its lens is commonly arranged on the back portion of the phone screen. FIG. 1 is a schematic diagram showing the back side of a conventional mobile phone. As shown, the image sensor contained in the camera module is installed inside the phone, while the camera lens is exposed externally. One or two light-emitting elements are disposed on the side of the lens or a light diffuser is provided on a light emitting element. The light emitting element or its combination with a light diffuser helps enhance luminance, thereby enhancing the picture, video and real-time image quality of the camera module. However the designed location of the flash module in conventional camera functions often results in uneven distribution of light, which diminishes the anticipated quality of resulting pictures or videos.

Therefore the foremost spirit and features of this invention to be disclosed are how to create a flash structure for the camera function of a handheld electronic device that aims primarily to enhance the picture, video and real-time image quality of the camera, while having a simple construction without increasing the manufacturing cost but enhancing the practicality of the flash module.

SUMMARY OF THE PRESENT INVENTION

The primary object of the present invention is to provide a flash structure for the camera function of a handheld electronic device, which mainly improves luminance uniformity during picture taking, video taping or real-time imaging, thereby enhancing the picture, video and real-time image quality and overall practicality of the camera module.

Another object of the present invention is to provide a flash structure for the camera function of a handheld electronic device that has a simple overall construction and does not increase manufacturing cost.

To achieve the aforesaid object, the present invention provides a flash structure for the camera function of a handheld electronic device for application on the motherboard and camera module of a handheld electronic device. The camera module comprises a camera lens and an image sensor; the flash structure comprises an outer cover, an annular reflector, at least a light diffuser, and one or a plurality of fixed light-emitting elements. The outer cover is arranged outside the camera module of the handheld electronic device. The center of the annular reflector passes through the camera lens and is embedded on the motherboard of the handheld electronic device, and is arranged with at least a through-slot thereon. The light diffuser is disposed around the camera module and situated outside the annular reflector and outside the light-emitting element. The one or a plurality of fixed light-emitting elements are embedded in the through-slot of the annular reflector and arranged around the camera lens, and electrically connected to the motherboard of the handheld electronic device.

In a preferred embodiment, the fixed light-emitting element is a light-emitting diode (LED) or an electronic flash or the combination thereof.

In comparison with prior art, the flash structure for the camera function of a handheld electronic device of the invention mainly features the arrangement of a plurality of light-emitting elements around the camera lens coupled with a ring-shaped or arc-shaped light diffuser so as to rendering supplemental lighting uniform. The flash structure of the invention can enhance the picture, video and real-time image quality for the camera. In addition, the flash structure has a simple construction without adding to the manufacturing cost, making it a practical application.

DETAILED DESCRIPTION OF THE PREFERRED EMBODIMENT

The implementation of the invention is described below through specific embodiments of the invention. Persons skilled in the art can easily understand other advantages and effects of the invention through the description disclosed herein.

The embodiments of the invention are described below in reference to the accompanying drawings. It should be noted that the drawings are simplified schematic drawings to illustrate the basic ideas of the invention schematically. The diagrams only depict the related structure of the invention and are not drawn according to the actual number, shapes and dimensions of components used in actual implementation, and hence should not be construed as a limitation on the forms, quantities and dimensions of respective components in actual implementation, which may vary based on the actual design needs.

Figure 1:
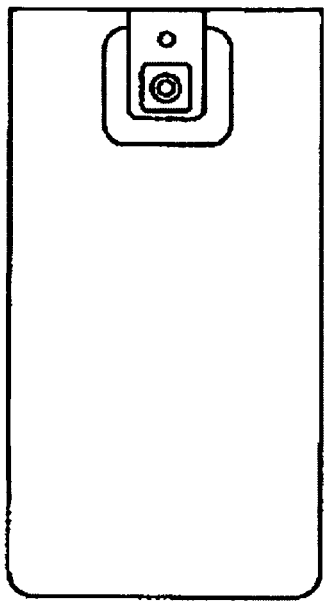
FIG. 1 is a schematic diagram of the back side of a conventional mobile phone.
Figure 2:
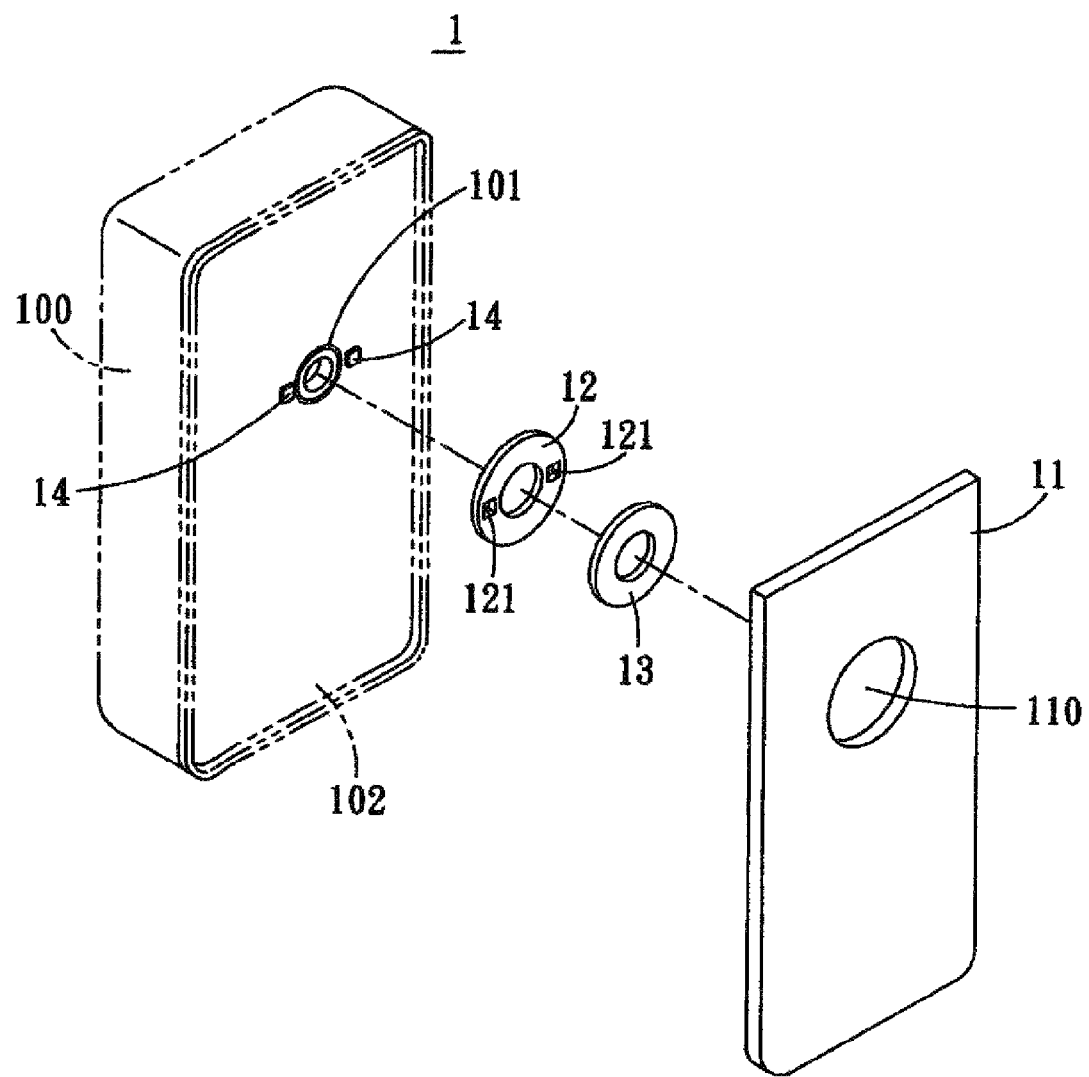
FIG. 2 is an exploded view of the flash structure for the camera function of a handheld electronic device according to a preferred embodiment of the invention.
Figure 3:
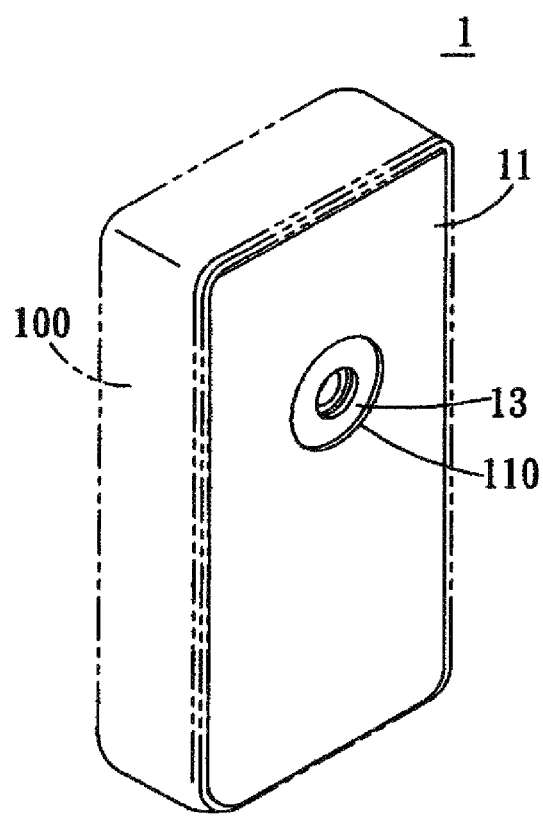
FIG. 3 is an assembled view of the flash structure for the camera function of a handheld electronic device according to a preferred embodiment of the invention.
Figure 4:
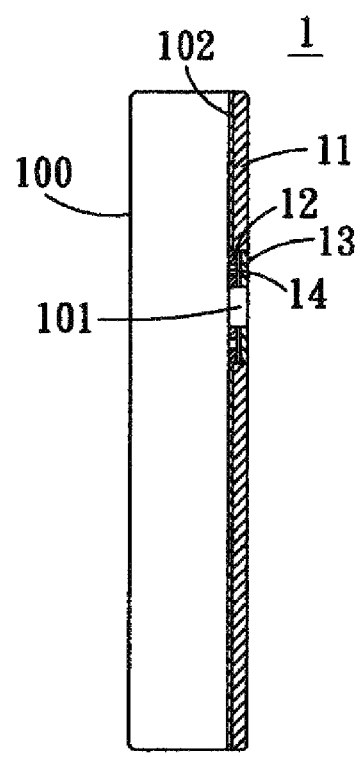
FIG. 4 is a side sectional view of the flash structure for the camera function of a handheld electronic device according to a preferred embodiment of the invention.

FIGS. 2, 3 and 4 are respectively an exploded view, an assembled view and a side sectional view of the flash structure for the camera function of a handheld electronic device according to a preferred embodiment of the invention. As shown, the flash structure for the camera function of a handheld electronic device 1 is illustrated as used in a handheld electronic device 100 (excluding the outer shell), the handheld electronic device 100 being a mobile phone, smartphone or digital camera. The handheld electronic device 100 comprises a camera module 101 with fixed or interchangeable lens. The flash structure for the camera function of a handheld electronic device 1 comprises an outer cover 11, an annular reflector 12, a light diffuser 13 and a plurality of light-emitting elements 14.

The outer cover 11 is disposed with a through-hole 110 and provided outside the camera module 101 of the handheld electronic device 100. The through-hole 110 corresponds to an area that covers the camera lens of the camera module 101 plus the light diffuser 13. The camera module 101 comprises a camera lens and an image sensor. The motherboard 102 of the handheld electronic device 100 is electrically connected to the camera module 101. The annular reflector 12 is embedded on the motherboard 102 and situated around the camera module 101. The annular reflector 12 is disposed with at least a through-slot 121. The light diffuser 13 is disposed outside the annular reflector 12 and outside the fixed light-emitting element 14, and around the lens of the camera module 101. The fixed light-emitting element 14 is embedded in the through-slot 121 of the annular reflector 12 and positioned around the camera lens of the camera module 101, and electrically connected to the motherboard 102 of the handheld electronic device 100.

In this embodiment, there are two fixed light-emitting elements 14, which can be light-emitting diodes or electronic flashes or the combination thereof and can generate continuous or intermittent light based on the setting and different needs. The annular reflector 12 is preferably mirror surface, white color, or silver color. Naturally the number of fixed light-emitting element 14 is not limited to two, which can be one or more than two in other embodiments. The handheld electronic device can be a mobile phone, or a smartphone, a digital camera, a tablet computer or a notebook computer.

The installations of light diffuser 13 and fixed light-emitting element 14 enable uniform diffusion of light, which enhances luminance during picture taking, video taping and real-time imaging, thereby improving the quality and aesthetics of pictures and videos taken. In addition, the invention has a simple construction, which helps reduce the manufacturing cost and increases its practicality.

Figure 5A:
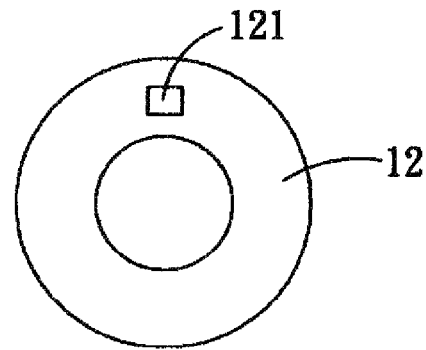
FIGS. 5A-5C are schematic diagrams of the annular reflector in the flash structure for the camera function of a handheld electronic device according to different embodiments of the invention.
Figure 5B:
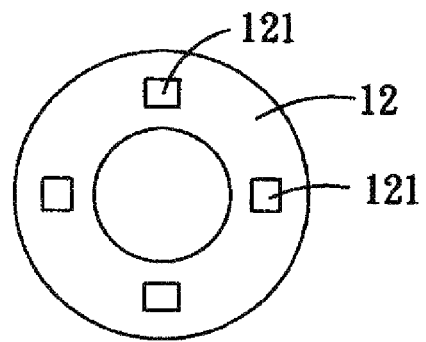
Figure 5C:
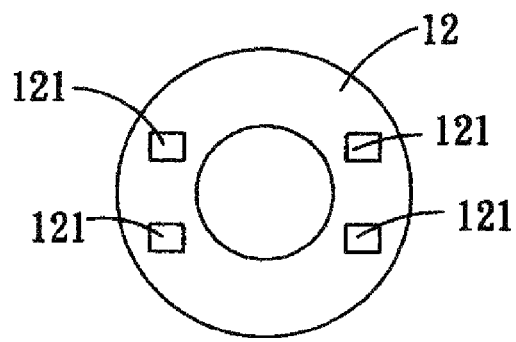

FIGS. 5A-5C are schematic diagrams of the annular reflector in the flash structure for the camera function of a handheld electronic device according to different embodiments of the invention. As shown in another embodiment, the annular reflector 12 is disposed with one through-slot 121 for accommodating one single fixed light-emitting element 14 (FIG. 5A). The annular reflector 12 can also be disposed with four through-slots 121 arranged circularly and equal distance apart (FIG. 5B). The annular reflector 12 can also be disposed with two through-slots 121 each on its right and left sides (FIG. 5C). As such, the pattern of arrangement and the number of fixed light-emitting elements 14 can be adjusted according to different needs to enable uniform diffusion of light, thereby improving the luminance and quality during picture taking, videotaping and real-time imaging.

Figure 6A:
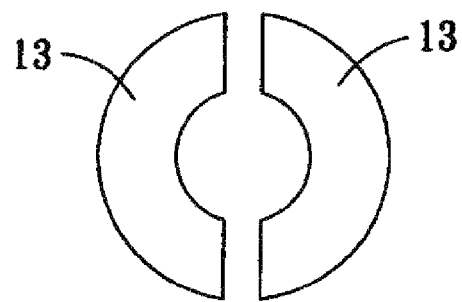
FIGS. 6A-6C are schematic diagrams of the light diffuser in the flash structure for the camera function of a handheld electronic device according to different embodiments of the invention.
Figure 6B:
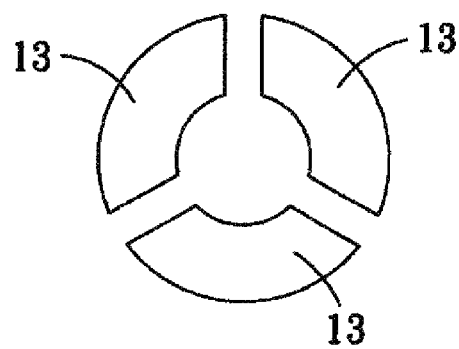
Figure 6C:
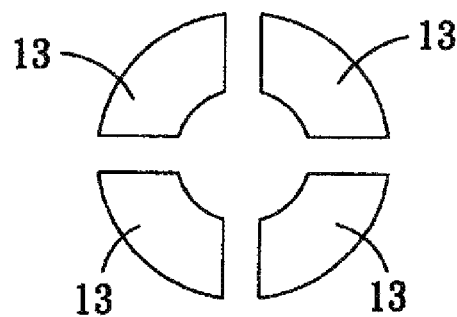

FIGS. 6A-6C are schematic diagrams of the light diffuser in the flash structure for the camera function of a handheld electronic device according to different embodiments of the invention. As shown in other embodiments, the light diffuser 13 comes in two, three or four pieces that are in arc shape and arranged circularly. Such arrangement can achieve the effect of ring flash to increase the luminance during picture taking, video taping and real-time imaging, thereby enhancing the quality and aesthetics of photos and videos.

As compared to prior art, the flash structure for the camera function of a handheld electronic device according to this invention mainly features the installation of annular reflector, light diffuser and fixed light-emitting element and enables adjustment to the number and pattern of arrangement of the fixed light-emitting elements and enables uniform light diffusion. As such, it increases luminance during picture taking, video taping and real-time imaging, thereby enhancing the picture, video and real-time image quality. Moreover the simple construction of the invention helps reduce cost and enhance its practicality.

The preferred embodiments of the present invention have been disclosed. It should be understood that all additions, modifications and substitutions made to the preferred embodiments of the invention without departing from the spirits of the invention and appended claims shall remain within the protected scope and claims of the invention. Persons skilled in the art can realize that the invention can be applied in handheld electronic devices with modified form, structure, arrangement, proportion, material, element and component. Therefore, the examples cited above are meant to explain the invention and not to limit the invention. The actual applicable scope of the invention is defined by the claims below and covers all legal equivalents thereof without being limited by the description above.

What is claimed is:

1. A flash structure for a handheld electronic device having a camera module, comprising:
   an outer cover, having a through-hole, adapted for disposing on a baseboard of the handheld electronic device where the camera module is located thereat and is electrically connected to the baseboard;
   an annular reflector, having a ring-shape, embedded on the baseboard of the handheld electronic device and situated around the camera module at a position that a camera lens of the camera module is located at a center of said annular reflector, wherein said annular reflector further has at least a through-slot provided thereat;
   at least a fixed light-emitting element being embedded in said through-slot of said annular reflector, wherein said fixed light-emitting element is positioned around the camera lens and electrically connected to the baseboard of the handheld electronic device; and
   at least a light diffuser provided on said annular reflector and situated outside said fixed light-emitting element to encircle around the camera lens of the camera module, wherein said light diffuser is located within said through-hole of said outer cover.

2. The flash structure, as recited in claim 1, wherein said fixed light-emitting element is at least one of a light-emitting diode (LED) and an electronic flash.

3. The flash structure, as recited in claim 2, wherein said fixed light-emitting element generates continuous and intermittent light sources or simply intermittent light source.

4. The flash structure, as recited in claim 1, wherein the handheld electronic device includes mobile phones, smartphones, digital cameras, tablet computers and notebook computers.

5. The flash structure, as recited in claim 1, wherein said fixed light-emitting element is multiple in number and are arranged on the through-slots of the annular reflector in equal or unequal distance apart.

6. The flash structure, as recited in claim 1, wherein said light diffuser consists of one piece of ring-shaped light diffuser.

7. The flash structure, as recited in claim 1, wherein said light diffuser consists of two pieces of symmetrical arc-shaped light diffusers.

8. The flash structure, as recited in claim 1, wherein said light diffuser consists of more than two pieces of light diffusers in circular arrangement.

9. A handheld electronic device with camera function, comprising:
   a baseboard;
   a camera module located at and electrically connected to said baseboard, wherein said camera module has a camera lens; and
   a flash structure, which comprises:
   an outer cover, having a through-hole, coupled on said baseboard;
   an annular reflector, having a ring-shape, embedded on the baseboard of the handheld electronic device and situated around said camera module at a position that said camera lens of said camera module is located at a center of said annular reflector, wherein said annular reflector further has at least a through-slot provided thereat;
   at least a fixed light-emitting element being embedded in said through-slot of said annular reflector, wherein said fixed light-emitting element is positioned around said camera lens and electrically connected to said baseboard; and
   at least a light diffuser provided on said annular reflector and situated outside said fixed light-emitting element to encircle around said camera lens of said camera module, wherein said light diffuser is located within said through-hole of said outer cover.

10. The handheld electronic device, as recited in claim 9, wherein the fixed light-emitting element is at least one of a light-emitting diode (LED) and an electronic flash for element generates continuous and intermittent light sources or simply intermittent light source.

11. The handheld electronic device, as recited in claim 9, which is one of mobile phones, smartphones, digital cameras, tablet computers and notebook computers.

12. The handheld electronic device, as recited in claim 9, wherein said fixed light-emitting element is multiple in number and are arranged on the through-slots of the annular reflector in equal or unequal distance apart.

13. The handheld electronic device, as recited in claim 9, wherein said light diffuser consists of one piece of ring-shaped light diffuser.

14. The handheld electronic device, as recited in claim 9, wherein said light diffuser consists of two pieces of symmetrical arc-shaped light diffusers.

15. The handheld electronic device, as recited in claim 9, wherein said light diffuser consists of more than two pieces of light diffusers in circular arrangement.

* * * * *